United States Patent [19]

Browne

[11] Patent Number: 4,531,607

[45] Date of Patent: Jul. 30, 1985

[54] VEHICLE WINDSHIELD LUBRICATION SYSTEM

[75] Inventor: Alan L. Browne, Grosse Pointe, Mich.

[73] Assignee: General Motors Corporation, Detroit, Mich.

[21] Appl. No.: 615,915

[22] Filed: May 31, 1984

[51] Int. Cl.³ .............................................. B60R 21/08
[52] U.S. Cl. ..................................... 180/282; 280/730; 296/84 K
[58] Field of Search ............... 180/282; 280/730, 736; 296/84 K

[56] References Cited

U.S. PATENT DOCUMENTS

| 3,642,303 | 2/1972 | Irish | 280/730 |
| 3,737,193 | 6/1973 | Cain | 296/84 K |
| 3,810,655 | 5/1974 | Prachar | 280/736 |
| 3,819,204 | 6/1974 | Oka | 280/730 |
| 4,232,080 | 11/1980 | Orain | 296/84 K |

Primary Examiner—Ronald H. Lazarus
Attorney, Agent, or Firm—Herbert Furman

[57] ABSTRACT

A coating of viscous lubricant, such as silicone, is applied to the inner surface of a vehicle windshield after the onset of vehicle impact with an obstacle exceeding a predetermined level. The coating provides a lubricant film between the pieces of the fractured inner layer of the windshield and the head of an occupant should the occupant engage and fracture the windshield.

2 Claims, 4 Drawing Figures

VEHICLE WINDSHIELD LUBRICATION SYSTEM

This invention relates to a vehicle windshield lubrication system and more particularly to the application of a coating of lubricant to the inner surface of a vehicle windshield should an impact of the vehicle with an obstacle exceed a predetermined impact level.

BACKGROUND OF THE INVENTION

It is known to apply an anti-lacerative layer of plastic material, such as polyurethane or polyester/polyvinyl butyral, to the inner surface of the inner glass layer of a conventional laminated vehicle windshield in order to reduce lacerations to the head of a seated, unrestrained vehicle occupant. Such lacerations can occur should the head of such occupant fracture the windshield and slide over the edges of the pieces of the fractured inner layer of glass during occupant movement subsequent to impact of the vehicle with an obstacle. The layer of plastic material reduces the contact of the head of the occupant with the edges of the pieces of the inner layer of glass.

SUMMARY OF THE INVENTION

This invention differs from the prior art by applying a coating of lubricant to the inner surface of the windshield only upon impact of the vehicle with an obstacle which exceeds a predetermined impact level. This invention thus obviates any difficulties which may occur from having the layer of plastic material on the windshield at all times, such as scratching. The invention also obviates any manufacturing problems which might be incurred in applying the layer of plastic material to the inner surface of the windshield.

In order to carry out the invention, a source of viscous lubricant, such as silicone, is mounted on the vehicle adjacent the inner surface of the inner glass layer of a laminated vehicle windshield. A sensor is mounted on the body to sense impacts of the vehicle with an obstacle which exceed a predetermined level, such as a predetermined change in vehicle velocity or a predetermined change in vehicle acceleration within a predetermined increment of time. When the sensor is actuated, it causes the lubricant to be released from the source and either splashed or sprayed on the inner surface of the windshield to thereby form a coating on the inner surface of the windshield prior to any engagement of the head of a seated occupant with such windshield and fracture thereof. Since the movement of the occupant relative to the vehicle trails the actuation of the sensor by a time increment of 60 to 80 ms, the coating can be applied and perform its intended function prior to any possible engagement of the head of the occupant with the inner surface of the windshield.

The primary object of this invention is to apply a coating of lubricant on the inner surface of a vehicle windshield should the impact of the vehicle with an obstacle exceed a predetermined impact level. Another object is to splash or spray the lubricant on the windshield from a source adjacent the inner surface of the windshield should the predetermined level be exceeded.

These and other objects of the invention will be readily apparent from the following specification and drawings wherein.

Figure 1:
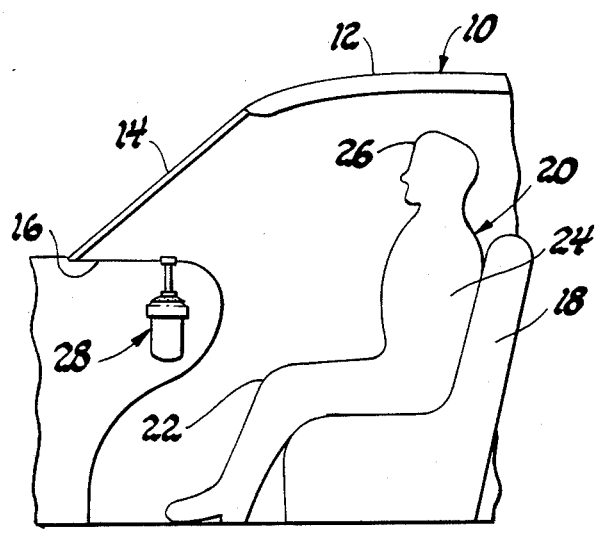
FIG. 1 is a schematic view of a portion of a vehicle and seated unrestrained occupant during normal vehicle travel.
Figure 2:
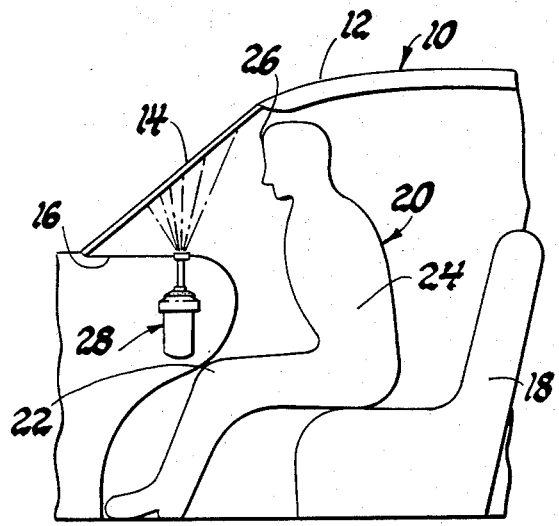
FIG. 2 is a schematic view showing occupant movement and the application of a coating of lubricant on the inner surface of the vehicle windshield upon a predetermined vehicle impact level being exceeded.
Figure 3:
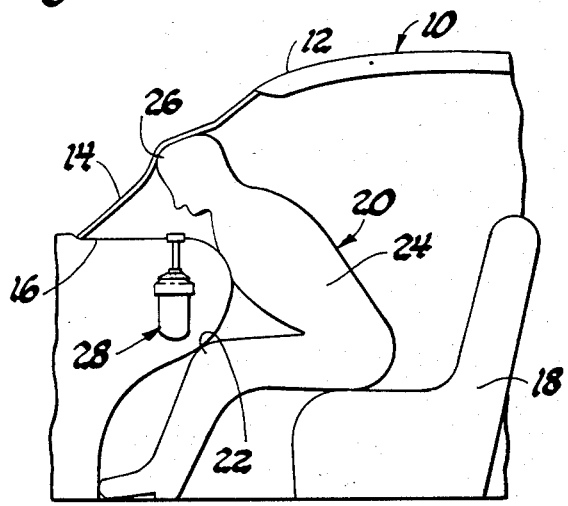
FIG. 3 is a schematic view showing engagement of the head of the occupant with the coated windshield.

Referring now to FIGS. 1 through 3 of the drawings, a conventional vehicle designated generally 10 includes a roof structure 12, a conventional multi-layer laminated vehicle windshield 14 having an outer layer and an inner layer joined by an intermediate layer of polyvinyl butyral, an instrument panel structure 16 and a front seat 18 which supports an unrestrained seated occupant 20. As indicated in FIG. 2, in the event that impact of the vehicle with an obstacle exceeds a predetermined impact level, the seated occupant will start shifting forwardly of the vehicle 10 and vehicle seat 18 so that the knees 22 of the occupant engage the instrument panel structure 16 and the upper torso 24 of the occupant folds relative to the lower torso about the H point. This movement of the occupant is initiated 60 to 80 ms after the onset of impact.

Upon continued movement of the occupant forwardly of the vehicle 10 and the vehicle seat 18, the upper torso 24 of the occupant will continue to fold relative to the lower torso and the head 26 of the occupant will engage and fracture the windshield 14 as shown in FIG. 3. The polyvinyl butyral intermediate layer of the windshield prevents separation of the fractured pieces of glass of both the inner and outer layers of the windshield so that the windshield bulges as indicated in FIG. 3 but the pieces of fractured glass remain contiguous with each other. Although the pieces are contiguous, the edges of the pieces of the inner layer can have a lacerative effect on the head of the occupant as the head of the occupant moves downwardly and forwardly of the windshield 14 upon continued movement of the occupant forwardly of the vehicle and of the seat and continued movement of the upper torso relative to the lower torso.

In accordance with this invention, a source 28 of viscous lubricant is mounted within the instrument panel structure. In the event of vehicle impact with an obstacle exceeding a predetermined level, as will be described, the source 28 is actuated to spray the viscous lubricant on the inner surface of the windshield 14 and form a coating thereon prior to contact of the head of the occupant with the windshield. The coating of lubricant provides an anti-lacerative effect so as to obviate the extent of laceration of the head of the occupant upon engagement and relative movement of the head of the occupant with the windshield.

Figure 4:
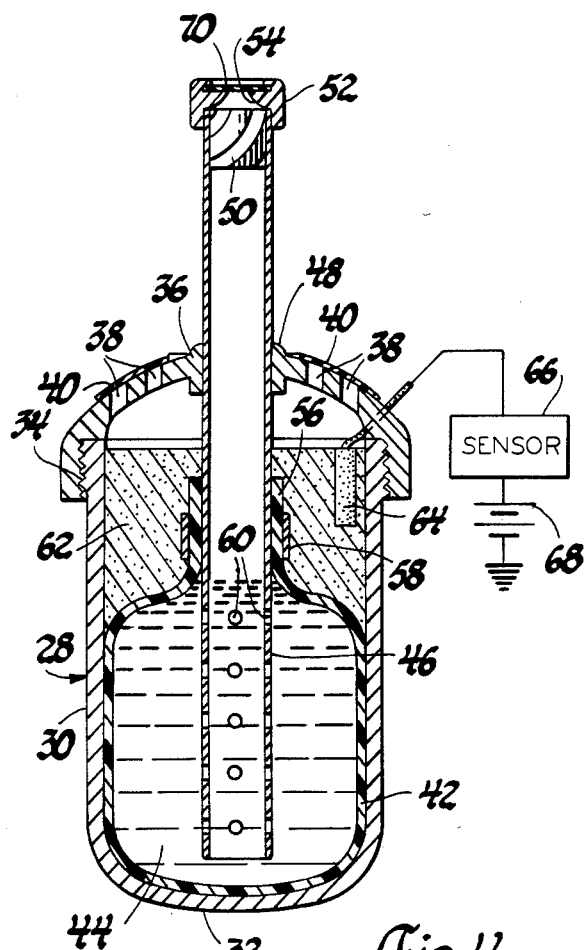
FIG. 4 is a broken away enlarged portion of FIG. 1.

Referring now to FIG. 4 of the drawing, the source 28 includes a cylindrical vessel or housing 30 having a closed dome type end wall 32. The axial wall of housing 30 is externally threaded at 34 and an internally threaded cap or housing closure 36 is threaded thereto to close the housing.

The closure 36 includes rows of circumferentially spaced openings 38 which are sealed by tape 40.

A flexible container 42 fits within the housing 30 and conforms to the axial wall thereof and to the end wall 32 thereof. The container may be made of any suitable material, such as neoprene type rubber, and is filled with viscous lubricant 44, such as silicone.

A cylindrical tube or conduit 46 is fixed to a cylindrical axial flange 48 of the closure 36. A swirl nozzle 50 is fixed within the upper end of the conduit. The upper end of the conduit is closed by a cap 52 fixed thereto and having a convergent type nozzle 54 which cooperates with the swirl nozzle 50 to provide an atomizing nozzle. The neck or outlet 56 of the container 42 receives the conduit and is conventionally clamped thereto at 58 to provide a pressure seal between the container and the conduit. The conduit further includes a number of radial openings 60 which communicate the interior of the conduit with the container 42. The lower end of the conduit opens to the container.

A charge of propellant material 62, such as conventional black powder with other ingredients, is contained within the housing 30 between the flexible container 42 and the closure 36. As shown, the charge annularly surrounds the neck 56 of the container and the conduit 46. A conventional igniter 64 is provided for igniting the charge. The igniter is conventionally connected across a sensor 66 and a source of power 68.

The sensor 66 may be an inertial type sensor or an acceleration sensor which respectively senses impacts of the vehicle with an obstacle of a magnitude sufficient to generate a predetermined change in vehicle velocity or an acceleration pulse of predetermined amplitude and time.

When the sensor 66 is actuated due to impact of the vehicle with an obstacle, the charge 62 will be ignited by the igniter 64 to generate a volume of high temperature and high pressure gas. The generated gas will act upon the flexible container 42 to compress and squeeze this container so that the lubricant 44 will be forced through the openings 60 and through the lower open end of the conduit 46 and upwardly of the conduit. As the liquid is forced upwardly, it will flow through the swirl nozzle 50 and the convergent nozzle 54 and be atomized and spread on the inner surface of the windshield 14 as shown in FIG. 2. Since the lubricant will be spread under pressure, it will forceably remove a pressure ruptureable seal 70, of rubber or thin metal, which closes the upper opening of the convergent nozzle 54 and which is staked, as shown, to cap 52.

As shown in FIG. 2, the lubricant 44 is spread on the inner surface of the windshield 14 to form a coating thereon prior to any contact of the head 26 of the occupant 20 with the windshield. The openings 38 in the closure 36 and the tape 40 provide pressure relief for the excess gas generated within the housing 30 and the closure.

Normally it takes approximately 60 to 80 ms for the occupant 20 to move from the FIG. 3 position and this is sufficient time for the sensor 66 to be actuated and for the charge 62 to burn and force the lubricant 44 through the nozzles 50 and 54 in the form of a spray to coat the inner surface of the windshield 14. This coating will thus be in place on the inner surface of the windshield 14 as shown in FIG. 2 prior to any contact of the head of the occupant with the windshield as shown in FIG. 3.

When the head of the occupant engages and fractures the windshield 14 as shown in FIG. 3, the coating of lubricant on the inner surface provides a non-lacerating viscous film between the head of the occupant and the fractured pieces of the inner layer of the windshield as the head of the occupant slides along this inner layer. Thus, potential laceration of the head of the occupant is reduced.

Although a specific manner of applying the lubricant to the inner surface of the windshield has been shown and described, it should be noted that other manners of applying the lubricant may also be used. Thus, for example, the engagement of the knees of the occupant with the instrument panel structure 16 may be used to actuate a suitable sensor to in turn actuate a source of lubricant such as the source 28. Likewise the source 28 may be located in other areas of the vehicle other than in the instrument panel structure, such as within the roof structure 12 or in an accessory on the roof structure, such as a sunshade.

Thus this invention provides for the application of a coating of lubricant to the inner surface of a vehicle windshield should an impact of the vehicle with an obstacle exceed a predetermined impact level.

The embodiments of the invention in which an exclusive property or privilege is claimed are defined as follows:

1. In combination with a vehicle including a windshield and an occupant seated in the vehicle adjacent the inner surface of the windshield, a vehicle body windshield lubrication system comprising a source of lubricant, means operable to sense an impact of the vehicle with an obstacle exceeding a predetermined level, and means actuated by the sensing means for applying a coating of lubricant from the source to the inner surface of the windshield within a predetermined time after initiation of vehicle impact and prior to any contact of the head of the occupant with such inner surface of the windshield.

2. In combination with a vehicle including a windshield and an occupant seated in the vehicle adjacent the inner surface of the windshield, a vehicle body windshield lubrication system comprising a source of lubricant mounted on the vehicle, means for spraying lubricant from the source on the inner surface of the windshield, a sensor for sensing impacts of the vehicle with an obstacle exceeding a predetermined level, said spray means being actuated by the sensor for spraying the lubricant on the inner surface of the windshield within a predetermined time after initiation of vehicle impact and prior to any contact of the head of the occupant with the inner surface of the windshield.

* * * * *